US012780434B2

(12) United States Patent
Morton

(10) Patent No.: US 12,780,434 B2
(45) Date of Patent: Nov. 3, 2026

(54) AIRCRAFT PROPULSION SYSTEM PYLON WITH MULTIPLE MOUNTING STATIONS

(71) Applicant: RTX Corporation, Farmington, CT (US)

(72) Inventor: Jeffrey T. Morton, Manchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/079,912

(22) Filed: Mar. 14, 2025

(65) Prior Publication Data

US 2026/0274422 A1 Sep. 17, 2026

(51) Int. Cl.

| | |
|---|---|
| ***B64D 27/40*** | (2024.01) |
| ***B64C 39/10*** | (2006.01) |
| ***B64D 27/20*** | (2006.01) |

(52) U.S. Cl.
CPC ........... *B64D 27/402* (2024.01); *B64D 27/20* (2013.01); *B64C 2039/105* (2013.01)

(58) Field of Classification Search
CPC ...... B64D 27/402; B64D 27/40; B64D 27/14; B64D 27/20; B64C 39/10; B64C 2039/105
See application file for complete search history.

(56) References Cited

U.S. PATENT DOCUMENTS 5,443,229 A * 8/1995 O'Brien ................ B64D 27/20 60/797
7,107,755 B2 9/2006 El Hamel
12,024,305 B2 * 7/2024 Alstad .................... B64D 29/06
2011/0259996 A1 10/2011 Vetters
2014/0054413 A1 2/2014 Cazals
2016/0167798 A1 6/2016 Prentice
2019/0359352 A1 * 11/2019 Cooper ..................... F02C 7/20
2023/0322382 A1 * 10/2023 Dindar .................... B64C 21/01 244/36
2024/0409226 A1 * 12/2024 West ...................... B64D 27/14

OTHER PUBLICATIONS

EP Search Report for EP Patent Application No. 26165218.4 dated Jul. 27, 2026.

* cited by examiner

*Primary Examiner* — Magdalena Topolski
*Assistant Examiner* — Shanna Danielle Glover
(74) *Attorney, Agent, or Firm* — Getz Balich LLC

(57) ABSTRACT

A pylon for an aircraft projects spanwise along a span line out from a base end towards a first mounting station and a second mounting station. The first mounting station is disposed a first spanwise distance along the span line from the base end. The second mounting station is disposed a second spanwise distance along the span line from the base end. The second spanwise distance is greater than the first spanwise distance. The pylon is configurable to mount to: a portion of a first propulsion system at the first mounting station, wherein the first propulsion system comprises a first propulsor rotor with a first diameter; or a portion of a second propulsion system at the second mounting station, wherein the second propulsion system comprises a second propulsor rotor with a second diameter that is greater than the first diameter.

7 Claims, 13 Drawing Sheets

AIRCRAFT PROPULSION SYSTEM PYLON WITH MULTIPLE MOUNTING STATIONS

BACKGROUND OF THE DISCLOSURE

1. Technical Field

This disclosure relates generally to an aircraft and, more particularly, to mounting an aircraft propulsion system.

2. Background Information

Various pylon arrangements for mounting a propulsion system to an airframe of an aircraft are known in the art. While these known pylon arrangements have various benefits, there is still room in the art for improvement.

SUMMARY OF THE DISCLOSURE

According to an aspect of the present disclosure, an apparatus is provided for an aircraft that includes a pylon. This pylon includes a leading end, a trailing end, a base end, a first mounting station and a second mounting station. The pylon extends longitudinally between the leading end and the trailing end. The pylon projects spanwise along a span line out from the base end towards the first mounting station and the second mounting station. The first mounting station is disposed a first spanwise distance along the span line from the base end. The second mounting station is disposed a second spanwise distance along the span line from the base end. The second spanwise distance is greater than the first spanwise distance. The pylon is configurable to mount to: a portion of a first propulsion system at the first mounting station, wherein the first propulsion system comprises a first propulsor rotor with a first diameter; or a portion of a second propulsion system at the second mounting station, wherein the second propulsion system comprises a second propulsor rotor with a second diameter that is greater than the first diameter.

According to another aspect of the present disclosure, another apparatus is provided for an aircraft. This apparatus includes an airframe, a propulsion system and a pylon. The propulsion system includes a propulsor rotor. The pylon mounts at least a portion of the propulsion system to the airframe. The pylon includes a first support structure, a second support structure, a first mounting station, a second mounting station and a receptacle for the portion of the propulsion system laterally between the first support structure and the second support structure. The first mounting station is disposed spanwise between the airframe and the second mounting station along the first support structure and the second support structure. The first mounting station is configured to attach the portion of the propulsion system to the first support structure and the second support structure where the propulsor rotor has a diameter equal to or less than a threshold. The second mounting station is configured to attach the portion of the propulsion system to the first support structure and the second support structure where the diameter of the propulsor rotor is greater than the threshold.

According to still another aspect of the present disclosure, another apparatus is provided for an aircraft. This apparatus includes an airframe, a propulsion system and a pylon. The propulsion system includes a propulsor rotor. The pylon mounts at least a portion of the propulsion system to the airframe. The pylon includes a base end, a distal end, a base structure, an extension structure, a first mounting station and a second mounting station. The base structure projects spanwise along a span line out from the base end to an interface between the base structure and the extension structure. The extension structure projects spanwise along the span line out from the interface between the base structure and the extension structure towards the distal end. The first mounting station attaches the extension structure to the base structure. The first mounting station includes a first station first mount. The second mounting station attaches the portion of the propulsion system to the extension structure. The second mounting station includes a second station first mount. The second station first mount and the first station first mount have a common configuration.

The pylon may also include a first mounting beam. The first mounting station may include a first station first mount configured to attach the portion of the first propulsion system to the first mounting beam. The second mounting station may include a second station first mount configured to attach the portion of the second propulsion system to the first mounting beam.

The pylon may also include a second mounting beam. The first mounting station may include a first station second mount configured to attach the portion of the first propulsion system to the second mounting beam. The second mounting station may include a second station second mount configured to attach the portion of the second propulsion system to the second mounting beam.

The pylon may also include a receptacle laterally between the first mounting beam and the second mounting beam. The receptacle may be configured to receive the portion of the first propulsion system or the portion of the second propulsion system.

The second station first mount may be disposed at a spanwise distal end of the first mounting beam.

The first station first mount and the second station first mount may have different geometries.

The first station first mount and the second station first mount may have a common geometry.

The pylon may also include a base structure and an extension structure. The base structure may project spanwise out from the base end, and the base structure may include the first mounting station. The extension structure may be removably attached to the base structure, and the extension structure may include the second mounting station.

The extension structure may structurally tie the second propulsion system to the base structure when the pylon is configured to mount to the second propulsion system.

The first mounting station may include a first station first mount configurable to attach the first propulsion system to the base structure. The second mounting station may include a second station first mount configurable to attach the second propulsion system to the extension structure.

The first station first mount may also be configurable to attach the extension structure to the base structure when the pylon is configured to mount to the second propulsion system.

The first station first mount and the second station first mount may have different geometries.

The first station first mount and the second station first mount may have a common geometry.

The base structure may include a base receptacle configured to receive the portion of the first propulsion system when the pylon is configured to mount to the first propulsion system.

The base receptacle may be configured to receive a portion of the extension structure when the pylon is configured to mount to the second propulsion system.

The extension structure may include an extension receptacle configured to receive the portion of the second propulsion system when the pylon is configured to mount to the second propulsion system.

The apparatus may include an airframe including a body, a first wing and a second wing. The pylon may be mounted to the airframe at the base end.

The airframe may be configured as a blended wing body airframe.

The pylon may be mounted to the body at the base end.

The pylon may be mounted to a component of the airframe at a top side of the component of the airframe.

The pylon may be mounted to a component of the airframe at a bottom side of the component of the airframe.

The first propulsor rotor and/or the second propulsor rotor may be configured as an open propulsor rotor.

The first propulsor rotor and/or the second propulsor rotor may be configured as a ducted propulsor rotor.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
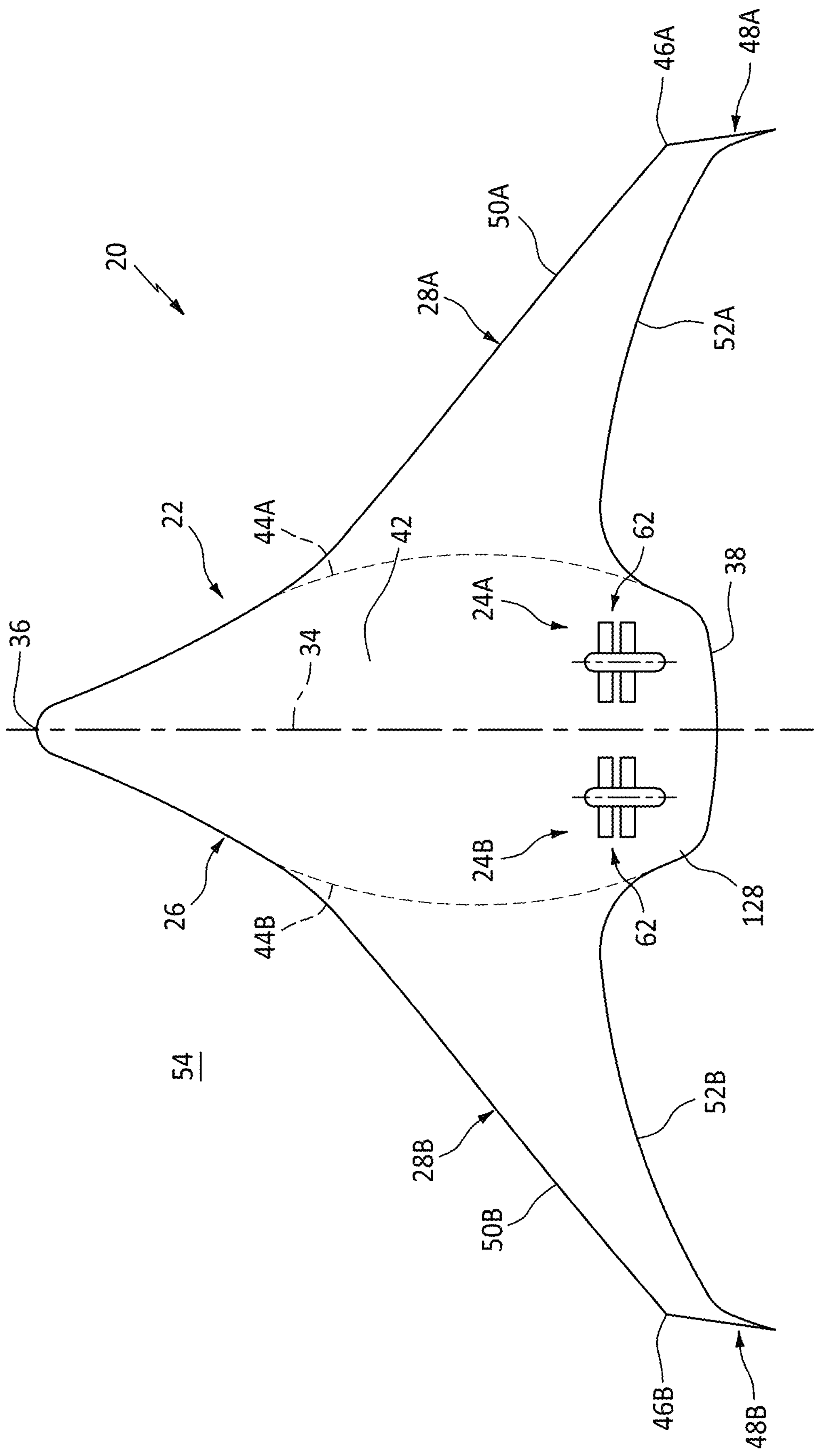
FIG. 1 is a plan view illustration of an aircraft.

FIG. 1 illustrates a blended wing body (BWB) aircraft 20. This BWB aircraft 20 includes an airframe 22 and one or more propulsion systems 24A and 24B (generally referred to as "24"). The aircraft airframe 22 includes a body 26 (e.g., a fuselage) and one or more wings 28A and 28B (generally referred to as "28").

Figure 2:
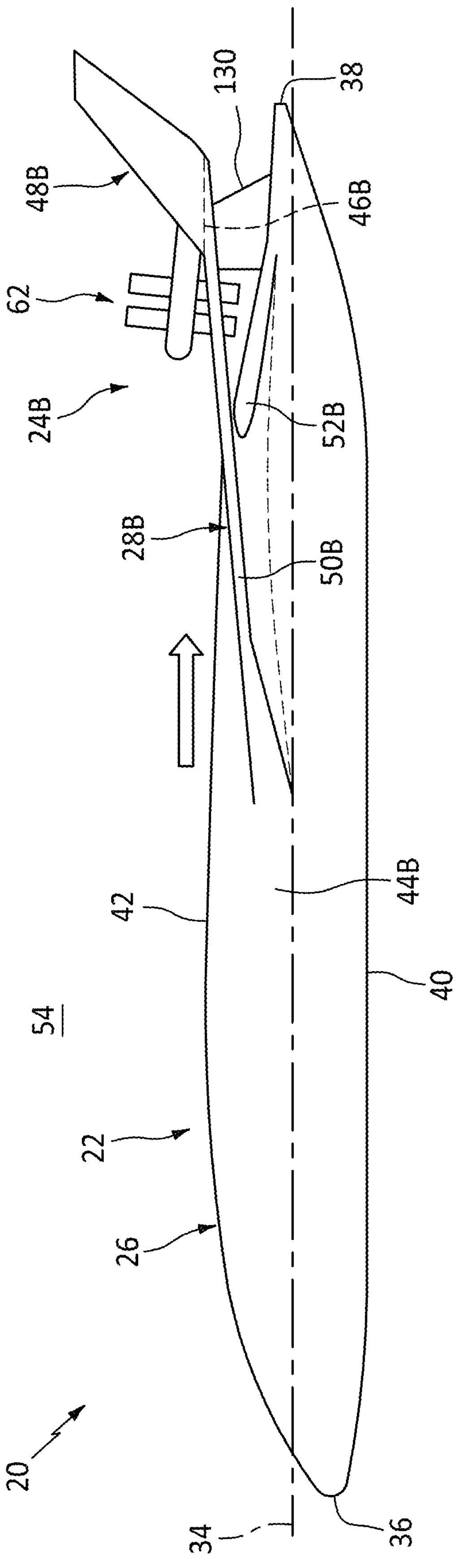
FIG. 2 is a side view illustration of the aircraft.
Figure 3:
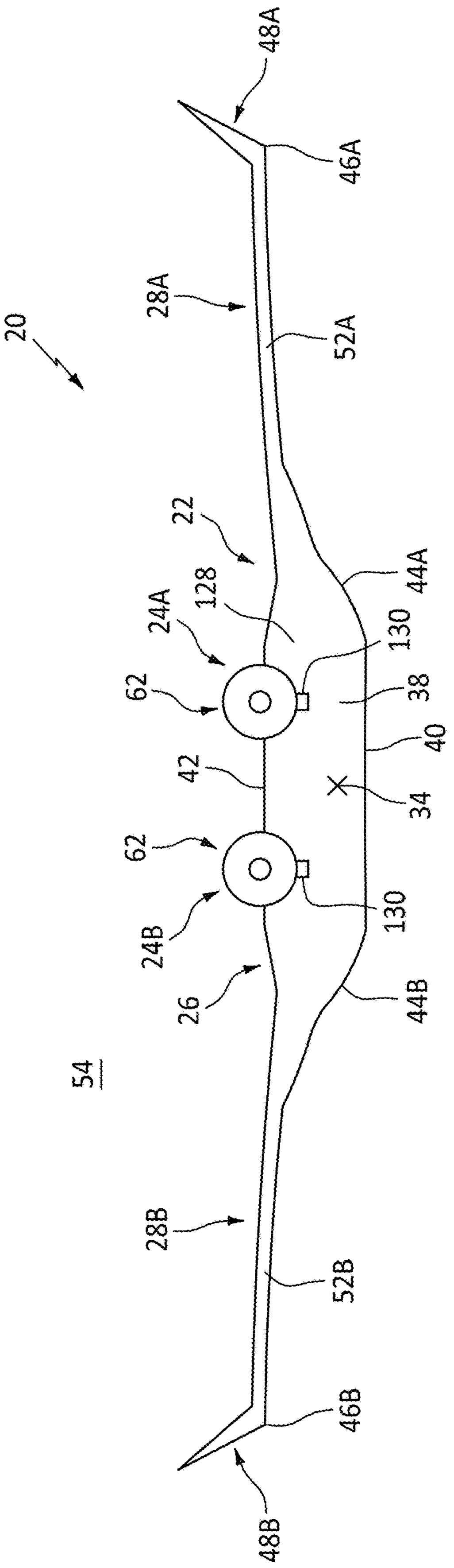
FIG. 3 is a rear end view illustration of the aircraft.

The aircraft body 26 of FIG. 1 extends longitudinally along a longitudinal centerline 34 from an upstream, forward end 36 (e.g., a tip end) of the BWB aircraft 20 and its aircraft body 26 to a downstream, aft end 38 (e.g., a tail end) of the aircraft body 26. This longitudinal centerline 34 may be a centerline axis of the BWB aircraft 20, the aircraft airframe 22 and/or the aircraft body 26. Referring to FIG. 2, the longitudinal centerline 34 may be substantially (e.g., within +/−five or ten degrees) or completely parallel with a horizon line when the BWB aircraft 20 is flying in level flight. The aircraft body 26 extends vertically between and to opposing vertical bottom and top sides 40 and 42 of the aircraft body 26. The body bottom side 40 is vertically below the body top side 42 with respect to a gravitational direction when the BWB aircraft 20 is flying in level flight. Referring to FIGS. 1 and 3, the aircraft body 26 extends laterally between and to opposing lateral sides 44A and 44B (generally referred to as "44") of the aircraft body 26.

The aircraft wings 28A and 28B of FIGS. 1 and 3 are arranged to the opposing lateral sides 44A and 44B of the aircraft body 26. Each of the aircraft wings 28 is connected to (e.g., fixed to) the aircraft body 26. Each of the aircraft wings 28A, 28B projects spanwise along a span line of the respective aircraft wing 28A, 28B out from the aircraft body 26, at the respective body lateral side 44A, 44B, to a distal tip 46A, 46B of the respective aircraft wing 28A, 28B. At the wing tip 46A, 46B, the respective aircraft wing 28A, 28B may (or may not) be configured with a winglet 48A, 48B. Each of the aircraft wings 28A, 28B of FIG. 1 extends longitudinally along a mean line of the respective aircraft wing 28A, 28B from a leading edge 50A, 50B (generally referred to as "50") of the respective aircraft wing 28A, 28B to a trailing edge 52A, 52B (generally referred to as "52") of the respective aircraft wing 28A, 28B. The wing leading edge 50 of FIG. 1, at a base of the respective aircraft wing 28, is longitudinally spaced aft, downstream from the body forward end 36. The wing trailing edge 52 of FIG. 1, at the wing base, is longitudinally spaced forward, upstream from the body aft end 38. The present disclosure, however, is not limited to such an exemplary aircraft wing arrangement.

Figure 4:
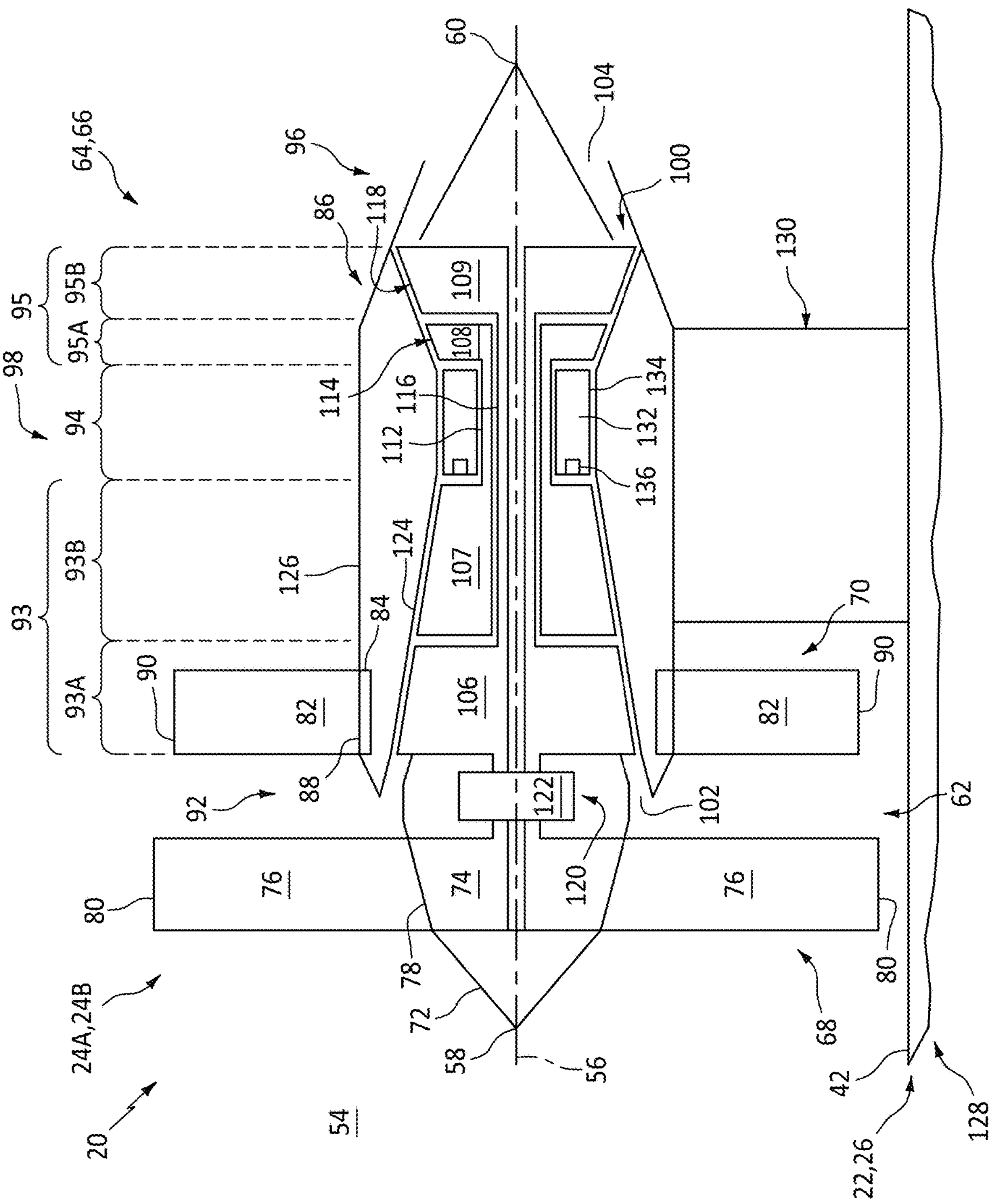
FIG. 4 is a schematic side sectional illustration of a propulsion system mounted to a portion of an airframe of the aircraft.

FIG. 4 illustrates an exemplary one of the aircraft propulsion systems 24. This aircraft propulsion system 24 of FIG. 4 is configured as an open rotor propulsion system with a single open rotor and swirl recovery vane (SRV) architecture. Herein, the term "open" may describe a propulsion system section and/or a propulsion system component which is open to an environment 54 (e.g., an ambient environment) external to the aircraft propulsion system 24 and, more generally, the BWB aircraft 20 (see FIGS. 1-3).

The aircraft propulsion system 24 of FIG. 4 extends axially along an axis 56 between an upstream, forward end 58 of the aircraft propulsion system 24 and a downstream, aft end 60 of the aircraft propulsion system 24. The propulsion system axis 56 may be a centerline axis of the aircraft propulsion system 24 and/or a centerline axis of one or more members of the aircraft propulsion system 24. The propulsion system axis 56 may also or alternatively be a rotational axis of one or more members of the aircraft propulsion system 24. The aircraft propulsion system 24 of FIG. 4 includes an open rotor propulsion section 62 (e.g., an open rotor propulsion module) and a power unit 64 for powering operation of the propulsion section 62. For ease of description, the power unit 64 is described below as a gas turbine engine 66. However, it is contemplated the power unit 64 may also or alternatively be configured as or otherwise include an electric motor and/or another type of combustion engine.

The propulsion section 62 of FIG. 4 includes an open propulsor rotor 68 and an open guide vane structure 70. These propulsion section members 68 and 70 are un-ducted components of the aircraft propulsion system 24 and its propulsion section 62. The propulsion section 62 of FIG. 4 also includes a nose cone 72 disposed at (e.g., on, adjacent or proximate) the propulsion system forward end 58. Briefly, this nose cone 72 may be configured as a spinner which is rotatable with the propulsor rotor 68 about the propulsion system axis 56. Alternatively, the nose cone 72 may be configured as a stationary structure of the propulsion section 62.

The propulsor rotor 68 includes a rotor base 74 (e.g., a disk or a hub) and a plurality of open propulsor blades 76 (e.g., airfoils). The propulsor blades 76 are arranged and may be equispaced circumferentially about the rotor base 74 and the propulsion system axis 56 in an array; e.g., a circular array. This array of the propulsor blades 76 may be unshrouded or alternatively shrouded by a tubular propulsor rotor shroud dedicated to the propulsor rotor 68 for example. Each of the propulsor blades 76 is connected to (e.g., formed integral with or otherwise attached to) the rotor base 74. Each of the propulsor blades 76 projects spanwise along a span line of the respective propulsor blade 76 (e.g., radially relative to the propulsion system axis 56) out from an exterior surface 78 of the rotor base 74, into the external environment 54, to a distal tip 80 of the respective propulsor blade 76. Here, the exterior surface 78 radially borders the external environment 54 and forms an inner platform surface of the propulsor rotor 68. Each propulsor blade 76 is thereby configured as an un-ducted propulsor blade which is exposed to (e.g., disposed in) the surrounding external environment 54.

The guide vane structure 70 of FIG. 4 includes a plurality of open exit guide vanes 82; e.g., airfoils. These guide vanes 82 are arranged and may be equispaced circumferentially about the propulsion system axis 56 in an array; e.g., a circular array. This array of the guide vanes 82 may be unshrouded or alternatively shrouded by a tubular guide vane shroud dedicated to the guide vane structure 70 for example. The guide vane structure 70 and its guide vanes 82 are arranged axially next to (e.g., adjacent) the propulsor rotor 68 and its propulsor blades 76. The guide vane structure 70 and its guide vanes 82 of FIG. 4, for example, are arranged downstream of the propulsor rotor 68 and its propulsor blades 76, without (e.g., any) other elements axially therebetween to obstruct, turn and/or otherwise influence the air propelled by the propulsor rotor 68 to the guide vane structure 70 for example. Each of the guide vanes 82 of FIG. 4 is coupled to a support structure 84 of a stationary housing structure 86 for the aircraft propulsion system 24. This support structure 84 may be configured as or otherwise include a support frame, a case and/or another fixed structure of the housing structure 86. Each of the guide vanes 82 projects spanwise along a span line of the respective guide vane 82 (e.g., radially relative to the propulsion system axis 56) out from an exterior surface 88 of the housing structure 86, into the external environment 54, to a distal tip 90 of the respective guide vane 82. Here, the exterior surface 88 radially borders the external environment 54 and forms an exterior aerodynamic flow surface of the aircraft propulsion system 24. Each guide vane 82 is thereby configured as an un-ducted guide vane which is exposed to (e.g., disposed in) the surrounding external environment 54.

The aircraft propulsion system 24 of FIG. 4 and its turbine engine 66 include an inlet section 92, a compressor section 93, a combustor section 94, a turbine section 95 and an exhaust section 96. The compressor section 93 of FIG. 4 includes a low pressure compressor (LPC) section 93A and a high pressure compressor (HPC) section 93B. The turbine section 95 of FIG. 4 includes a high pressure turbine (HPT) section 95A and a low pressure turbine (LPT) section 95B. At least (or only) the LPC section 93A, the HPC section 93B, the combustor section 94, the HPT section 95A and the LPT section 95B collectively form a core 98 (e.g., a gas generator) of the turbine engine 66. The aircraft propulsion system 24 of FIG. 4 and its turbine engine 66 also include an engine flowpath 100; e.g., an annular core flowpath. This engine flowpath 100 extends longitudinally through the engine core 98 from an airflow inlet 102 into the engine flowpath 100 to a combustion products exhaust 104 from the engine flowpath 100. The flowpath inlet 102 of FIG. 4 is also an airflow inlet into the aircraft propulsion system 24 and its turbine engine 66. The flowpath exhaust 104 of FIG. 4 is also a combustion products exhaust from the aircraft propulsion system 24 and its turbine engine 66.

The LPC section 93A includes a bladed low pressure compressor (LPC) rotor 106. The HPC section 93B includes a bladed high pressure compressor (HPC) rotor 107. The HPT section 95A includes a bladed high pressure turbine (HPT) rotor 108. The LPT section 95B includes a bladed low pressure turbine (LPT) rotor 109. Each of these engine rotors 106-109 includes a rotor base (e.g., a disk or a hub) and a plurality of rotor blades (e.g., airfoils, vanes, etc.). The rotor blades are arranged and may be equispaced circumferentially around the respective rotor base in an array. The rotor blades may also be arranged into one or more stages longitudinally along the engine flowpath 100. Each of the rotor blades is connected to the respective rotor base. Each of the rotor blades projects radially (e.g., spanwise) out from the respective rotor base into the engine flowpath 100 and to a distal tip of the respective rotor blade.

The HPC rotor 107 is coupled to and rotatable with the HPT rotor 108. The HPC rotor 107 of FIG. 4, for example, is connected to the HPT rotor 108 by a high speed shaft 112. At least (or only) the HPC rotor 107, the HPT rotor 108 and the high speed shaft 112 collectively form a high speed rotating structure 114; e.g., a high speed spool of the turbine engine 66 and its engine core 98. This high speed rotating structure 114 of FIG. 4 and its members 107, 108 and 112 are rotatable about the propulsion system axis 56. However, in other embodiments, the high speed rotating structure 114 may alternatively be rotatable about another rotational axis which is (e.g., laterally and/or angularly) offset from the rotational axis of the propulsor rotor 68.

The LPC rotor 106 is coupled to and rotatable with the LPT rotor 109. The LPC rotor 106 of FIG. 4, for example, is connected to the LPT rotor 109 by a low speed shaft 116. At least (or only) the LPC rotor 106, the LPT rotor 109 and the low speed shaft 116 collectively form a low speed rotating structure 118; e.g., a low speed spool of the turbine engine 66 and its engine core 98. This low speed rotating structure 118 of FIG. 4 and its members 106, 109 and 116 are rotatable about the propulsion system axis 56. However, in other embodiments, the low speed rotating structure 118 may alternatively be rotatable about another rotational axis which is (e.g., laterally and/or angularly) offset from the rotational axis of the propulsor rotor 68.

The low speed rotating structure 118 is coupled to the propulsor rotor 68 through a drivetrain 120. This drivetrain 120 may be configured as a geared drivetrain, where a geartrain 122 (e.g., a transmission, a speed change device, an epicyclic geartrain, etc.) is disposed between and operatively couples the propulsor rotor 68 to the low speed rotating structure 118 and its LPT rotor 109. With this arrangement, the propulsor rotor 68 may rotate at a different (e.g., slower) rotational speed than the low speed rotating structure 118 and its LPT rotor 109. Here, the propulsor rotor 68 and the low speed rotating structure 118 may rotate in a common (the same) direction about the propulsion system axis 56 or in opposite directions about the propulsion system axis 56 depending, for example, upon the specific configuration of the geartrain 122. Alternatively, the drivetrain 120 may be configured as a direct-drive drivetrain, where the geartrain 122 is omitted. With such an arrangement, the propulsor rotor 68 rotates at a common (the same) rotational speed as the low speed rotating structure 118 and its LPT rotor 109.

The inlet section 92, the LPC section 93A, the HPC section 93B, the combustor section 94, the HPT section 95A, the LPT section 95B and the exhaust section 96 may be arranged sequentially along the propulsion system axis 56. These engine sections 92-96 are housed within and/or formed by the housing structure 86. The housing structure 86 includes an engine case 124 (e.g., a gas generator case) and a propulsion system nacelle 126. The engine case 124 houses one or more of the engine sections 93A-95B; e.g., the engine core 98. The engine case 124 of FIG. 4, for example, extends axially along (e.g., axially overlaps) and extends circumferentially about (e.g., circumscribes) the engine sections 93A-95B and the respective engine rotors 106-109. The engine case 124 may also house at least a portion of the drivetrain 120 and its geartrain 122. The propulsion system nacelle 126 houses and provides an aerodynamic cover over the engine case 124. An exterior wall of the propulsion system nacelle 126 of FIG. 4, for example, is disposed radially outboard of, extends axially along (e.g., axially overlaps) and extends circumferentially about (e.g., circumscribes) the engine core 98 and its engine case 124. This nacelle wall may at least partially or completely form the exterior surface 88. With the foregoing arrangement, the engine rotors 106-109 are disposed within the housing structure 86. By contrast, the propulsor rotor 68 and the guide vane structure 70 are disposed at least partially (or completely) outside of the housing structure 86 within the external environment 54.

The aircraft propulsion system 24 of FIG. 4 is connected to a structure 128 of the aircraft airframe 22. This airframe structure 128 may include the aircraft body 26 and/or one or more of the aircraft wings 28 (see FIG. 1). The aircraft propulsion system 24 of FIG. 4 may also be located external to (e.g., outside of) the airframe structure 128 and its members 26 and 28. The aircraft propulsion system 24 of FIG. 4, for example, is disposed vertically above and is mounted (e.g., mechanically fixed) to the aircraft body 26 at (e.g., on, adjacent or proximate) the body top side 42 and, for example, the body aft end 38 (see FIG. 1). In particular, the aircraft propulsion system 24 of FIG. 4 is mounted to the aircraft body 26 by a propulsion system pylon 130; e.g., a propulsion unit pylon.

Referring to FIG. 1, the aircraft propulsion systems 24A and 24B are arranged to opposing lateral sides of the aircraft centerline 34 and, thus, a lateral center of the BWB aircraft 20 and its aircraft airframe 22. The first aircraft propulsion system 24A of FIG. 1, for example, is spaced laterally from the aircraft centerline 34 by a lateral first distance. The second aircraft propulsion system 24B of FIG. 1 is spaced laterally from the aircraft centerline 34 by a lateral second distance, which second distance may be equal to the first distance. The aircraft centerline 34 may thereby be arranged laterally midway between the aircraft propulsion systems 24.

During operation of the aircraft propulsion system 24 of FIG. 4, ambient air within the external environment 54 is propelled by the rotating propulsor rotor 68 in the downstream, aft direction towards the propulsion system aft end 60. A major portion (e.g., more than 50%) of this air bypasses the turbine engine 66 to provide forward thrust while a minor portion (e.g., less than 50%) of the air flows into the aircraft propulsion system 24 of FIG. 4 and its turbine engine 66. For example, an outer stream of the air propelled by the rotating propulsor rotor 68 flows axially across the guide vane structure 70 and outside of the housing structure 86 and its exterior surface 88; e.g., along an exterior of the propulsion system nacelle 126. The guide vane structure 70 conditions (e.g., straightens out, de-swirls, etc.) the outer stream of air within the external environment 54 to enhance the forward thrust. By contrast, an inner stream of the air propelled by the rotating propulsor rotor 68 may bypass the guide vane structure 70 and enter the turbine engine 66 and its engine flowpath 100 through the flowpath inlet 102. The air entering the engine flowpath 100 through the flowpath inlet 102 may be referred to as "core air".

The core air is compressed by the LPC rotor 106 and the HPC rotor 107 and directed into a combustion chamber 132 (e.g., an annular combustion chamber) of a combustor 134 (e.g., an annular combustor) in the combustor section 94. Fuel is injected into the combustion chamber 132 by one or more fuel injectors 136 and mixed with the compressed core air to provide a fuel-air mixture. This fuel-air mixture is ignited and combustion products thereof flow through and sequentially drive rotation of the HPT rotor 108 and the LPT rotor 109. The rotation of the HPT rotor 108 and the LPT rotor 109 respectively drive rotation of the HPC rotor 107 and the LPC rotor 106 and, thus, compression of the core air. The rotation of the LPT rotor 109 also drives the rotation of the propulsor rotor 68 through the drivetrain 120 and its geartrain 122. The turbine engine 66 and its low speed rotating structure 118 thereby power operation of (e.g., drive rotation of) the propulsor rotor 68 during aircraft propulsion system operation.

Thrust requirements for an aircraft may vary based on various factors. Examples of these factors include, but are not limited to: whether the aircraft will be used primarily for passenger transport or cargo transport; aircraft efficiency requirements; and/or aircraft speed requirements. The present disclosure contemplates utilizing at least a common power unit across a line of aircraft propulsion systems to satisfy various different thrust requirements. For example, the aircraft propulsion systems 24 of FIGS. 5A and 5B may share common turbine engine configurations. However, the propulsor rotor 68 of the aircraft propulsion system 24 of FIG. 5A has a first size 138A (e.g., a diameter), whereas the propulsor rotor 68 of the aircraft propulsion system 24 of FIG. 5B has a second size 138B (e.g., a diameter) that is greater than the first size 138A. The aircraft propulsion system 24 of FIG. 5B may thereby be tuned to provide different (e.g., higher) thrust level than the aircraft propulsion system 24 of FIG. 5A. Of course, it is contemplated the turbine engine 66 of the aircraft propulsion system 24 of FIG. 5A may (or may not) also be electronically and/or mechanically tuned (e.g., detuned) to match its (e.g., relative lower) specified thrust level. To accommodate aircraft propulsion systems with such different propulsor rotor sizes, each propulsion system pylon 130 of the present disclosure may be configured as a multi-mounting point pylon. Each propulsion system pylon 130, for example, may be configured to mount a respective aircraft propulsion system 24 at different distances from the aircraft airframe 22 and, more particularly, different vertical distances from the aircraft body 26 and its body top side 42. A mounting point for a respective aircraft propulsion system 24 may thereby be selected to provide, for example, a substantially common separation gap between the aircraft airframe 22 and the propulsor rotor 68, independent of the respective propulsor rotor size 138A, 138B (generally referred to as "138"). Of course, it is contemplated a size of the separation gap may alternatively vary based on the propulsor rotor size 138.

Figure 6B:
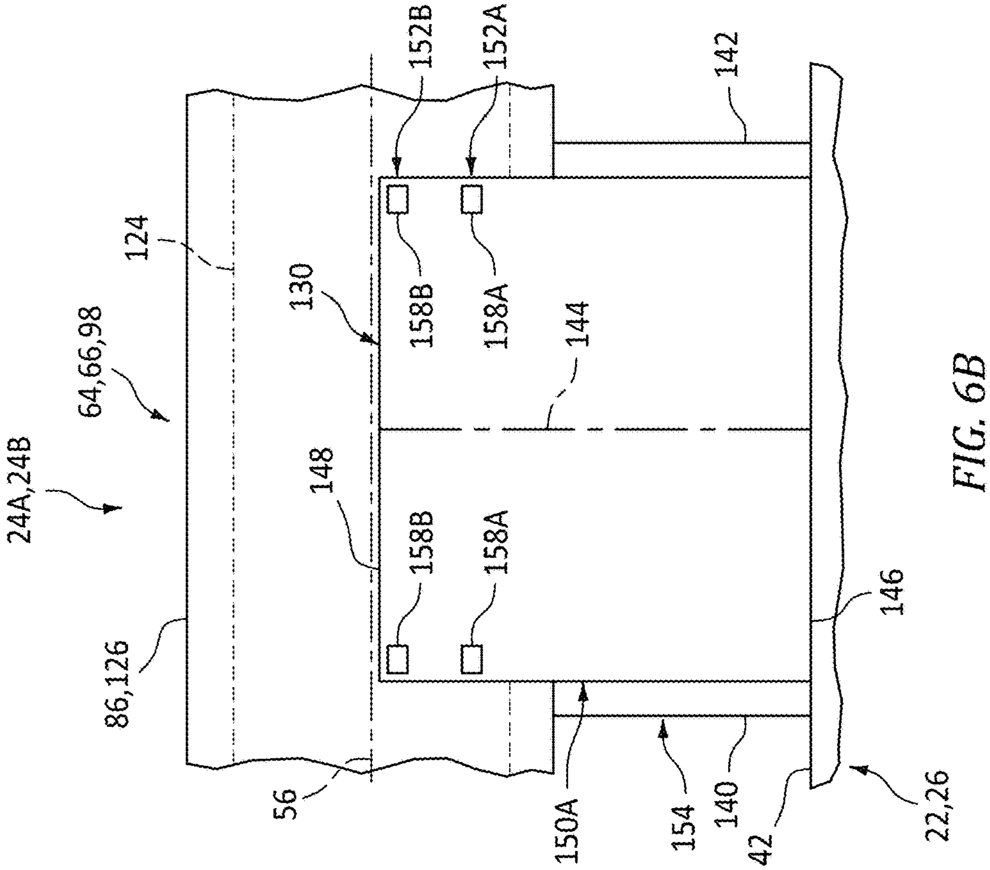
FIGS. 6A and 6B are schematic side illustrations of a portion of the propulsion system mounted to the aircraft airframe at different distances.
Figure 6A:
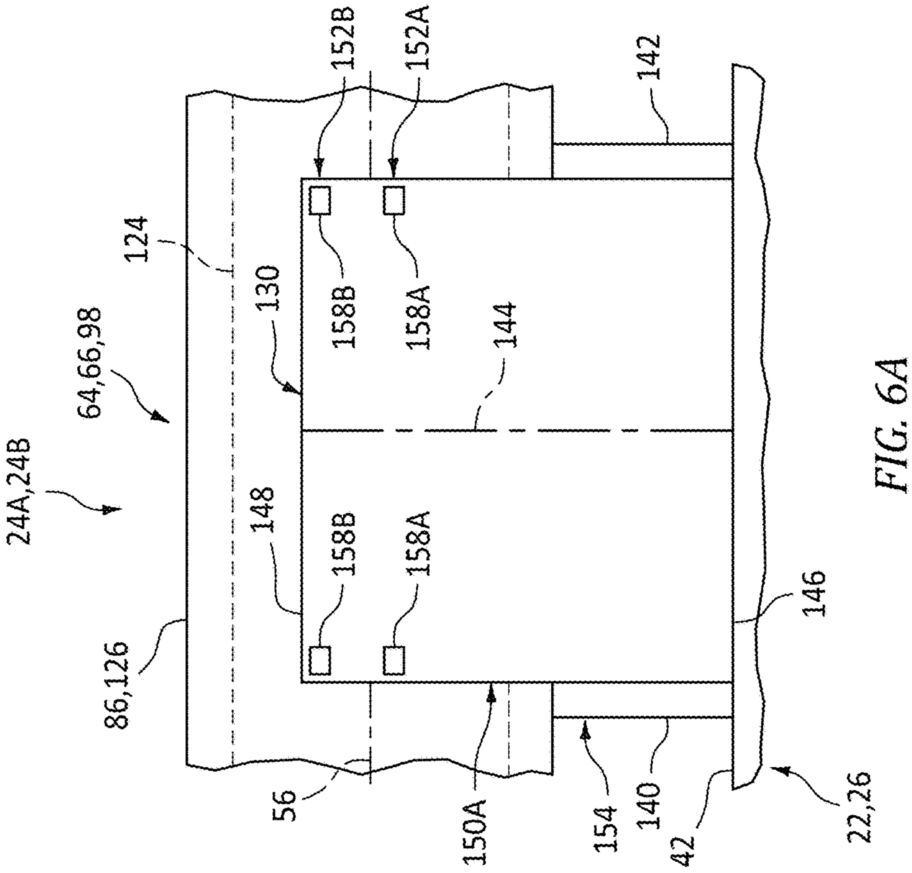
Figure 7B:
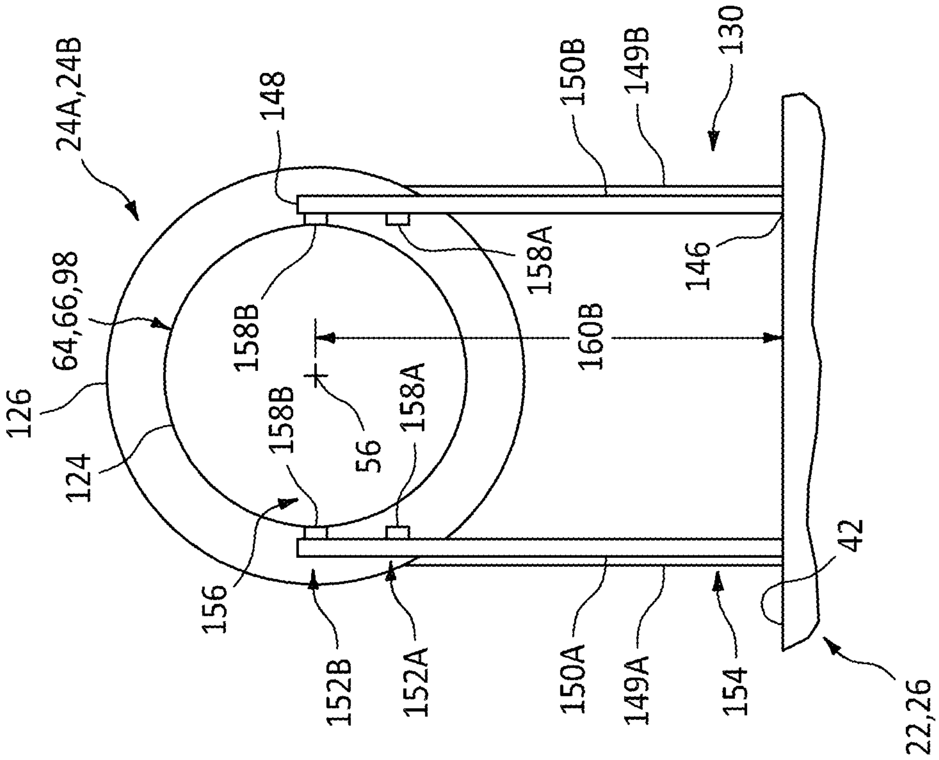
FIGS. 7A and 7B are schematic cross-sectional illustrations of a portion of the propulsion system mounted to the aircraft airframe at different distances.
Figure 7A:
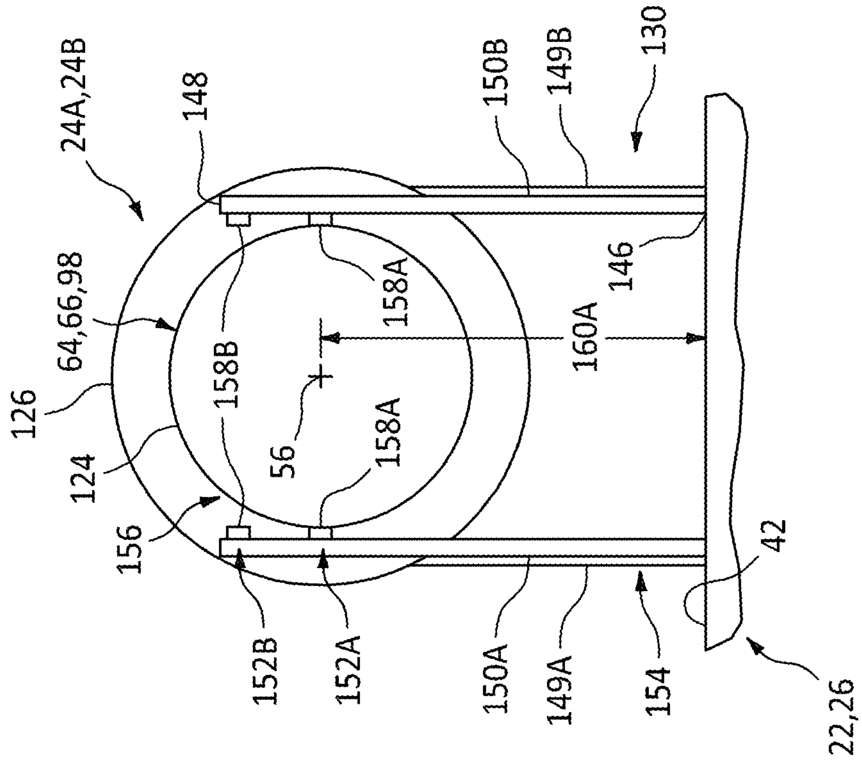

FIGS. 6A and 6B illustrate an exemplary one of the propulsion system pylons 130. The propulsion system pylon 130 of FIGS. 6A and 6B extends longitudinally from an upstream, forward leading end 140 of the propulsion system pylon 130 to a downstream, aft trailing end 142 of the propulsion system pylon 130. The propulsion system pylon 130 of FIGS. 6A and 6B projects spanwise along a span line 144 of the propulsion system pylon 130 (vertically relative to the aircraft airframe 22) from a base end 146 of the propulsion system pylon 130 to a distal end 148 of the propulsion system pylon 130. Here, the propulsion system pylon 130 is attached to the aircraft airframe 22 at its pylon base end 146. Referring to FIGS. 7A and 7B, the propulsion system pylon 130 extends laterally between opposing lateral sides 149A and 149B (generally referred to as "149") of the propulsion system pylon 130. The propulsion system pylon 130 of FIGS. 6A-7B includes one or more pylon support structures 150A and 150B (generally referred to as "150"), a plurality of mounting stations 152A and 152B (generally referred to as "152") and a pylon nacelle 154 providing an aerodynamic cover over the support structures 150.

Each support structure 150 may be configured as or otherwise include a mounting beam for the aircraft propulsion system 24. The first support structure 150A is disposed to the pylon first side 149A. The second support structure 150B is disposed to the pylon second side 149B. The support structures 150 of FIGS. 7A and 7B are laterally spaced apart. The propulsion system pylon 130 of FIGS. 7A and 7B is thereby configured with a propulsion system receptacle 156 formed by and extending laterally between the first support structure 150A and the second support structure 150B. Each of the support structures 150 projects spanwise/vertically out from the pylon base end 146 to the pylon distal end 148. Each of the support structures 150 may also be attached to the aircraft airframe 22 at the pylon base end 146.

The first mounting station 152A is disposed at an intermediate spanwise location along the propulsion system pylon 130 and its support structures 150. The first mounting station 152A of FIGS. 6A and 6B, for example, is located spanwise along the span line 144 between the pylon base end 146 and the pylon distal end 148. More particularly, the first mounting station 152A of FIGS. 6A and 6B is located spanwise along the span line 144 between the aircraft airframe 22 and the second mounting station 152B. The first mounting station 152A includes one or more first station mounts 158A. Referring to FIGS. 7A and 7B, a first set of one or more of these first station mounts 158A (e.g., first station first mounts) is arranged with and connected to the first support structure 150A. A second set of one or more of the first station mounts 158A (e.g., first station second mounts) is arranged with and connected to the second support structure 150B. Here, the first mounting station 152A and one or more or all of its first station mounts 158A are disposed a first spanwise distance 160A along the span line 144 from a reference point at the pylon base end 146/the aircraft airframe 22.

The second mounting station 152B is disposed at or about the pylon distal end 148 along the propulsion system pylon 130 and its support structures 150. The second mounting station 152B includes one or more second station mounts 158B. A first set of one or more of these second station mounts 158B (e.g., second station first mounts) is arranged with and connected to the first support structure 150A. Here, each of the second station mounts 158B may be longitudinally aligned with a respective one of the first station mounts 158A. A second set of one or more of the second station mounts 158B (e.g., second station second mounts) is arranged with and connected to the second support structure 150B. Here, the second mounting station 152B and one or more or all of its second station mounts 158B are disposed a second spanwise distance 160B along the span line 144 from the reference point at the pylon base end 146/the aircraft airframe 22, where the second spanwise distance 160B is greater than the first spanwise distance 160A (see FIG. 7A).

Figure 5B:
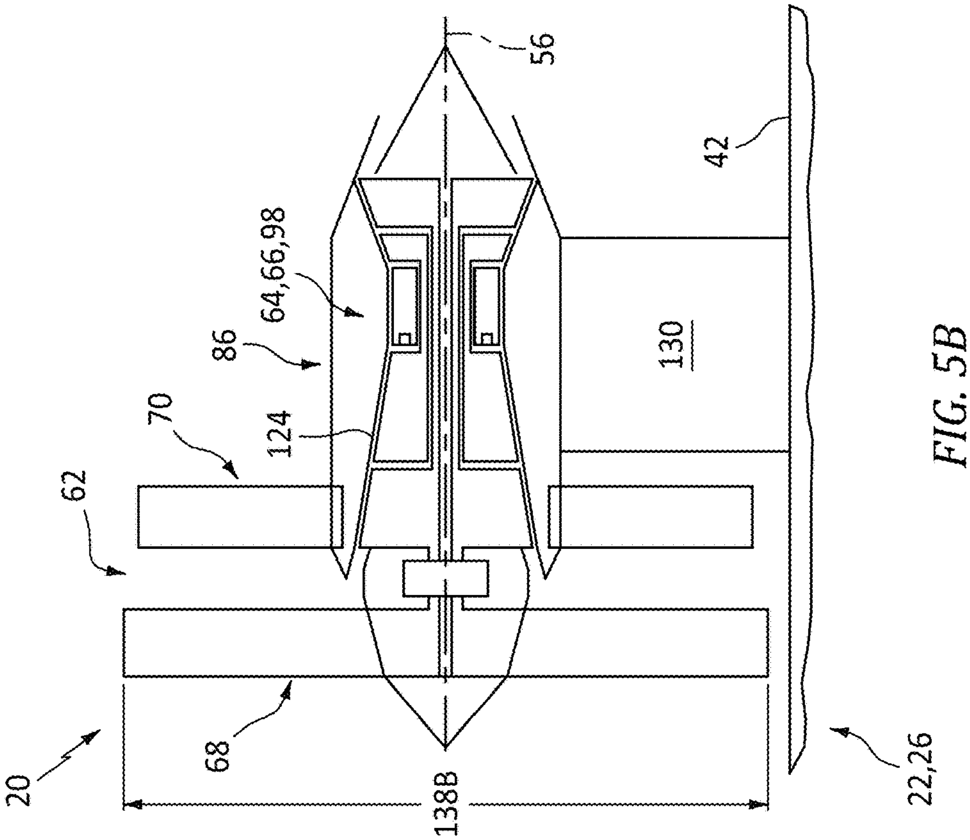
FIGS. 5A and 5B are schematic side sectional illustrations of the assembly of FIG. 4 with various propulsor rotor sizes.
Figure 5A:
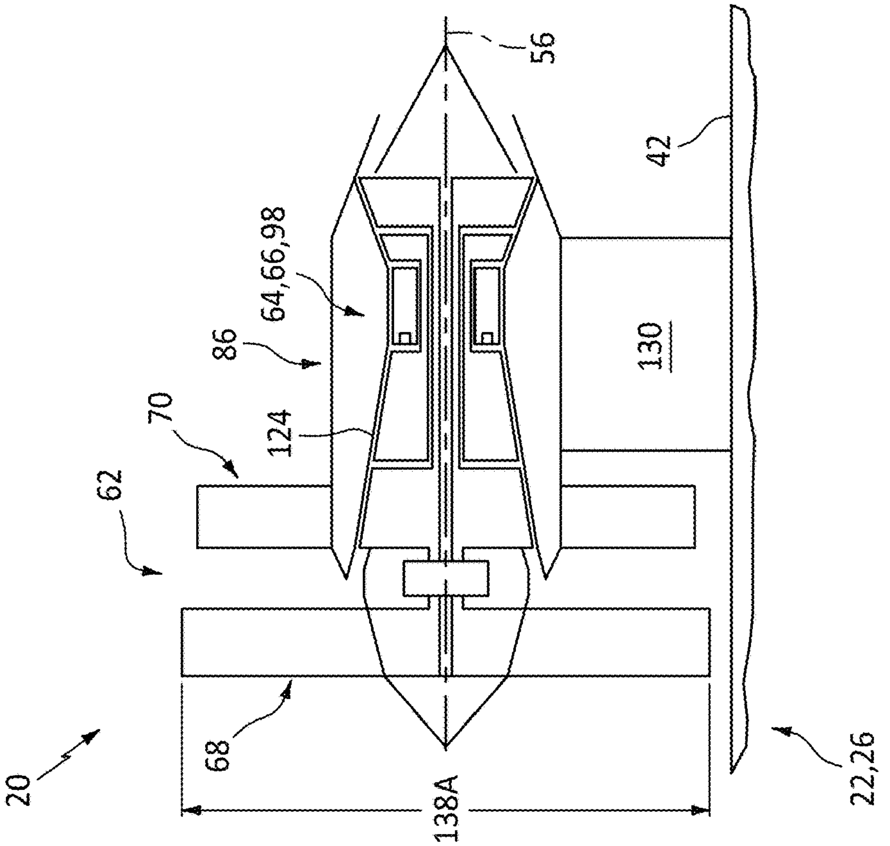

With the propulsion system pylon arrangement of FIGS. 6A-7B, the aircraft propulsion system 24 may be mounted to the propulsion system pylon 130 and its support structures 150 at the first mounting station 152A or at the second mounting station 152B. For example, where the propulsor rotor size 138A of FIG. 5A is equal to or less than a threshold, the aircraft propulsion system 24 of FIGS. 6A and 7A may be mounted to the propulsion system pylon 130 and its support structures 150 at the first mounting station 152A. The turbine engine 66 and its engine case 124 of FIGS. 6A and 7A, for example, may be mounted to the propulsion system pylon 130 and its support structures 150 by the first station mounts 158A. Here, the turbine engine 66 and its engine case 124 are received within the propulsion system receptacle 156 of FIG. 7A and laterally cradled between the support structures 150. By contrast, where the propulsor rotor size 138B of FIG. 5B is greater than the threshold, the aircraft propulsion system 24 of FIGS. 6B and 7B may be mounted to the propulsion system pylon 130 and its support structures 150 at the second mounting station 152B. The turbine engine 66 and its engine case 124 of FIGS. 6B and 7B, for example, may be mounted to the propulsion system pylon 130 and its support structures 150 by the second station mounts 158B. Here, the turbine engine 66 and its engine case 124 are also received within the propulsion system receptacle 156 of FIG. 7B and laterally cradled between the support structures 150. Thus, the single propulsion system pylon 130 of FIGS. 6A-7B may accommodate aircraft propulsion systems with different propulsor rotor sizes.

With the arrangement of FIGS. 6A-7B, the aircraft propulsion system 24 and its members 66 and 124 may be spanwise/vertically translated deeper or shallower into the propulsion system receptacle 156 (see FIGS. 7A and 7B) to facilitate attachment to the propulsion system pylon 130 at a respective one of the mounting stations 152. The propulsion system pylon 130 of FIGS. 6A-7B thereby provides multiple mounting points for the aircraft propulsion system 24, for example with little or no reconfiguring of the propulsion system pylon 130 and its members 150A and 150B.

In some embodiments, referring to FIGS. 6A-7B, each support structure 150 may be configured as a unitary structure. For example, where each support structure 150 is configured as a mounting beam, that mounting beam may extend spanwise uninterrupted from the pylon base end 146 to the pylon distal end 148. The present disclosure, however, is not limited to such an exemplary arrangement. For example, referring to FIGS. 8 and 9, each support structure 150 may alternatively include a base section 162A, 162B (generally referred to as "162") and an extension section 164A, 164B (generally referred to as "164").

Figure 8:
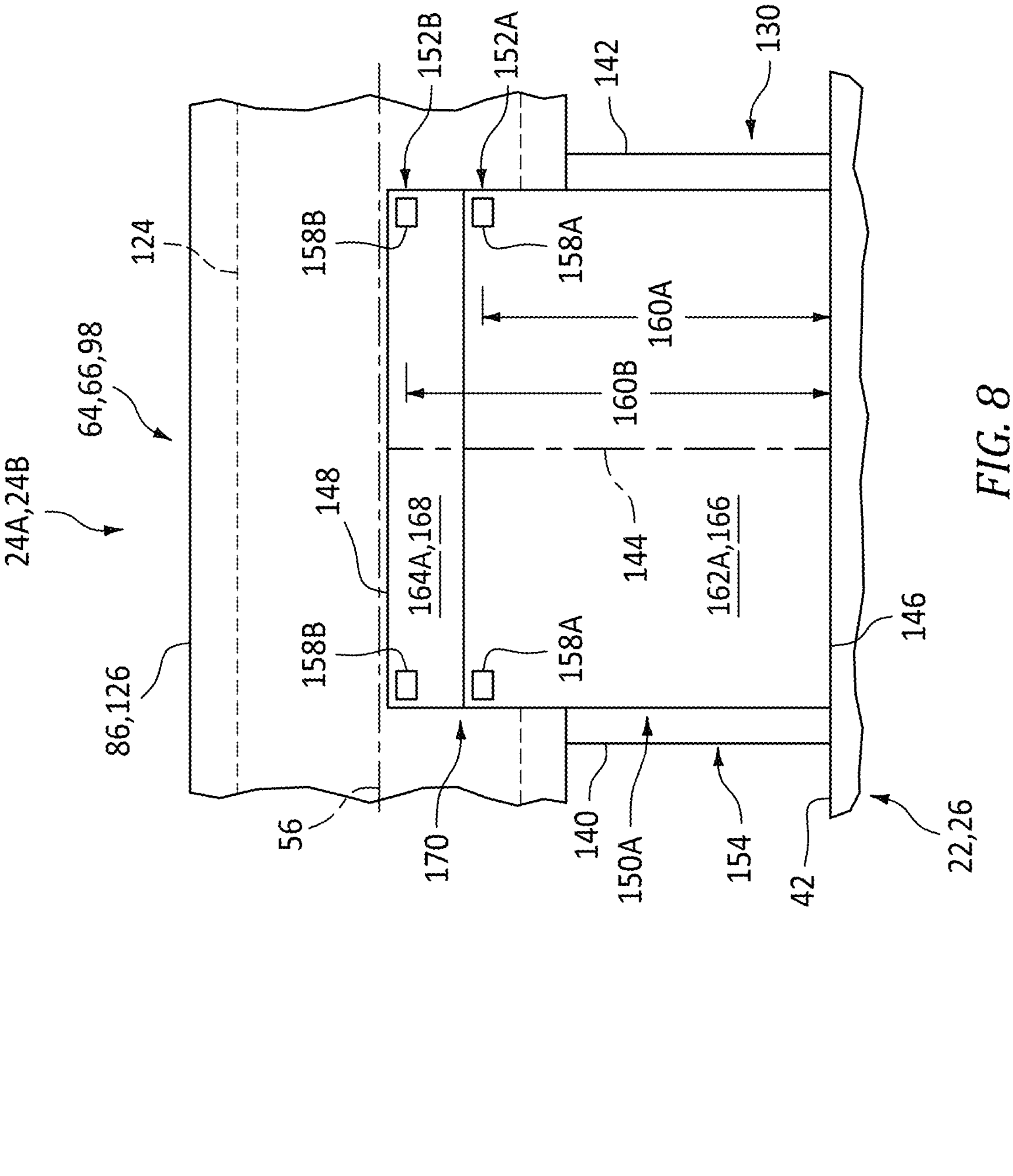
FIGS. 8 and 9 are schematic illustrations of portions of the propulsion system mounted to the aircraft airframe with an extended pylon.
Figure 9:
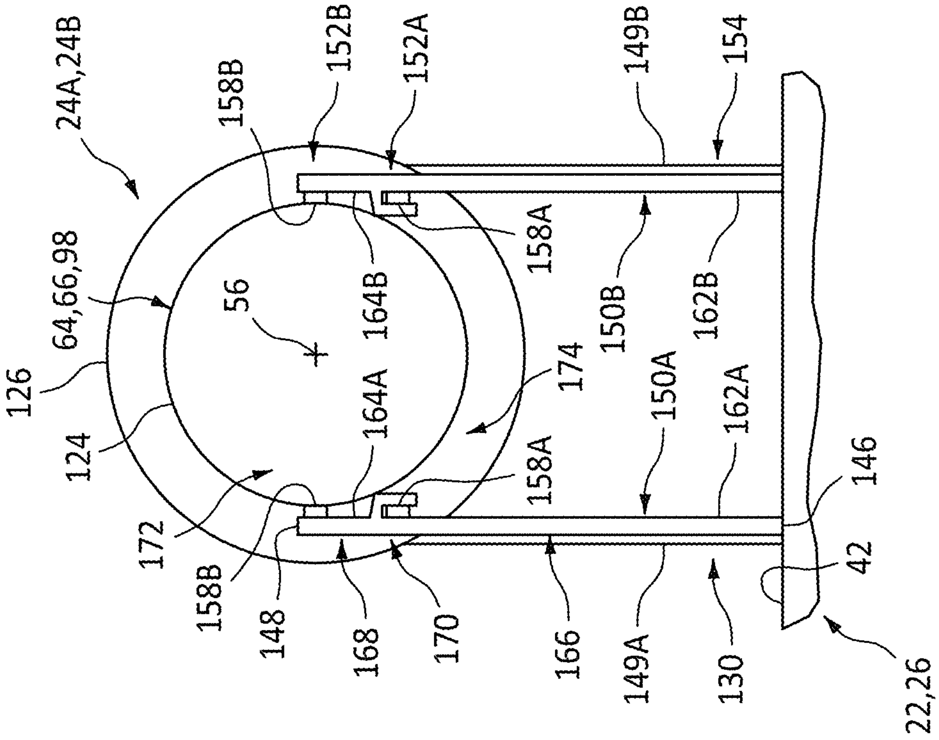

At least (or only) the base sections 162 may collectively form a base structure 166 of the propulsion system pylon 130. This pylon base structure 166 and its base sections 162 project spanwise along the span line 144 (see FIG. 8) out from the pylon base end 146 to a distal end of the pylon base structure 166. The pylon base structure 166 includes the first mounting station 152A and its first station mounts 158A. The first mounting station 152A and its first station mounts 158A of FIGS. 8 and 9 are disposed at the distal end of the pylon base structure 166. Here, the first mounting station 152A and one or more or all of its first station mounts 158A are disposed at the first spanwise distance 160A along the span line 144 from the reference point at the pylon base end 146/the aircraft airframe 22.

At least (or only) the extension sections 164 may collectively form an extension structure 168 of the propulsion system pylon 130. This pylon extension structure 168 is removably attached to the pylon base structure 166 at an inter-structure interface 170 between the pylon base structure 166 and the pylon extension structure 168. Each extension section 164, for example, may be mechanically fastened (e.g., bolted) to a respective one of the base sections 162 as the inter-structure interface 170. More particularly, the pylon extension structure 168 and its extension sections 164 of FIGS. 8 and 9 are attached to the pylon base structure 166 and its base sections 162 by the first station mounts 158A at the first mounting station 152A. The pylon extension structure 168 and its extension sections 164 may thereby project spanwise along the span line 144 out from the inter-structure interface 170 to the pylon distal end 148. The pylon extension structure 168 includes the second mounting station 152B and its second station mounts 158B. The second mounting station 152B and its second station mounts 158B of FIGS. 8 and 9 are disposed at the pylon distal end 148. Here, the second mounting station 152B and one or more or all of its second station mounts 158B are disposed the second spanwise distance 160B along the span line 144 from the reference point at the pylon base end 146/the aircraft airframe 22.

Figure 10:
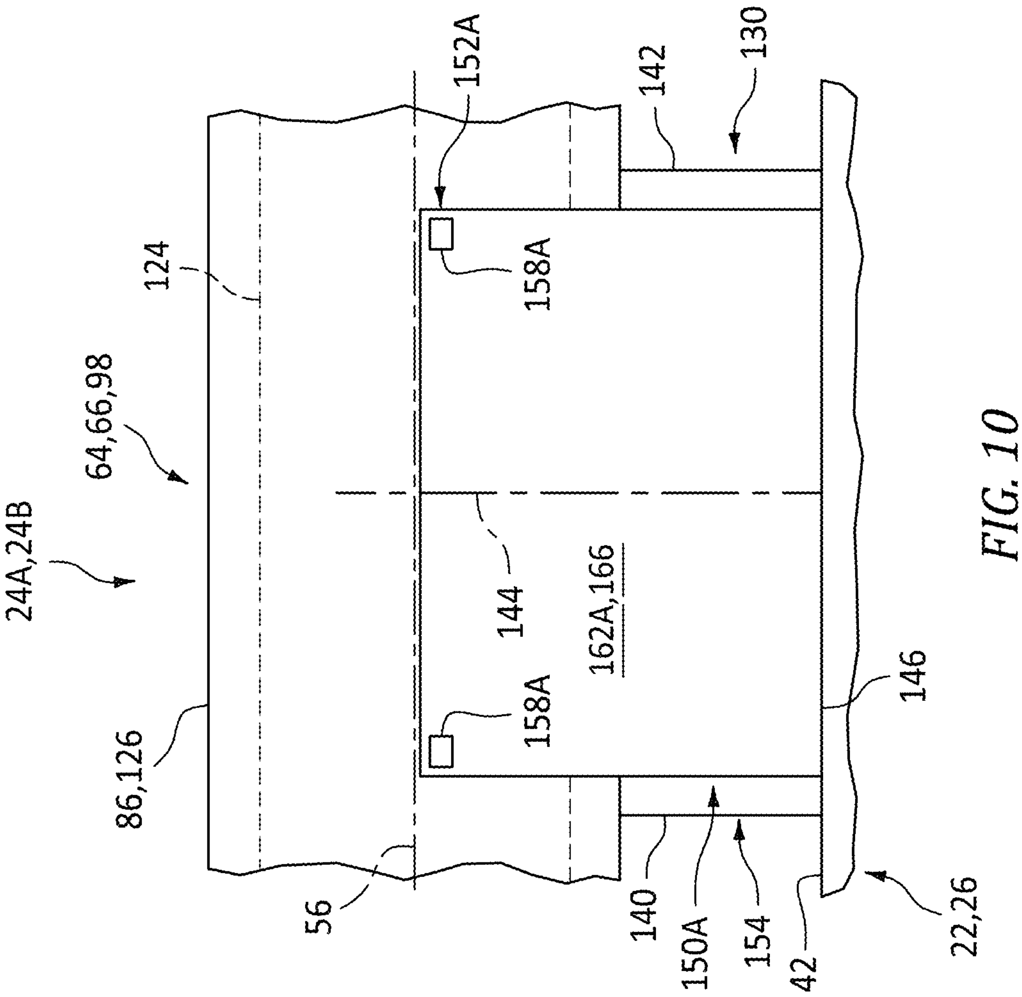
FIGS. 10 and 11 are schematic illustrations of portions of the propulsion system mounted to the aircraft airframe with an un-extended pylon.
Figure 11:
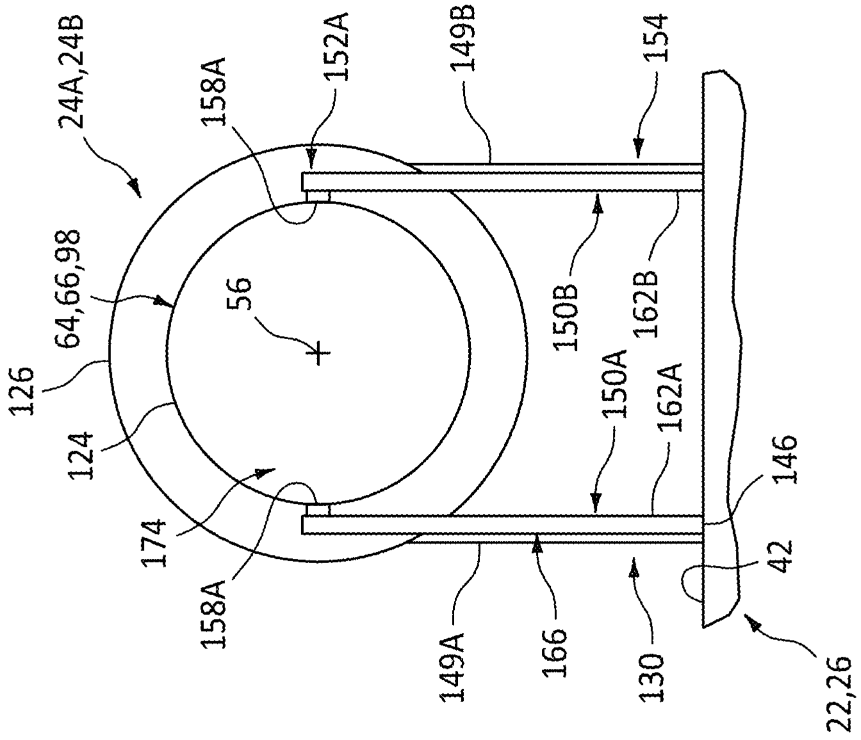

With the propulsion system pylon arrangement FIGS. 8 and 9, the propulsion system pylon 130 is provided with a modular configuration. For example, where the propulsor rotor size 138B of FIG. 5B is greater than the threshold, the aircraft propulsion system 24 of FIGS. 8 and 9 may be mounted to the propulsion system pylon 130 and its pylon extension structure 168 at the second mounting station 152B. More particularly, the turbine engine 66 and its engine case 124 may be mounted to the propulsion system pylon 130 and its pylon extension structure 168 by the second station mounts 158B. The turbine engine 66 and its engine case 124 may also be received within a receptacle 172 (see FIG. 9) of the pylon extension structure 168, laterally cradled between the extension sections 164. Here, the pylon extension structure 168 is included as a structural part of the propulsion system pylon 130. For example, the pylon extension structure 168 and its extension sections 164 structurally tie the turbine engine 66 and its engine case 124 and, more generally, the aircraft propulsion system 24 to the pylon base structure 166 and its base sections 162. The pylon base structure 166 and its base sections 162 structurally tie the pylon extension structure 168 and its extension sections 164 to the aircraft airframe 22 and its aircraft body 26. By contrast, where the propulsor rotor size 138A of FIG. 5A is equal to or less than the threshold, the aircraft propulsion system 24 of FIGS. 10 and 11 may be mounted to the propulsion system pylon 130 and its pylon base structure 166 at the first mounting station 152A. More particularly, the turbine engine 66 and its engine case 124 may be mounted to the propulsion system pylon 130 and its pylon base structure 166 by the first station mounts 158A. The turbine engine 66 and its engine case 124 may also be received within a receptacle 174 (see FIG. 11) of the pylon base structure 166, laterally cradled between the base sections 162. Here, the pylon extension structure 168 is removed from and no longer included as part of the propulsion system pylon 130.

In some embodiments, referring to FIGS. 6A-9, each of the first station mounts 158A may be longitudinally and/or laterally aligned with a respective similarly situated one of the second station mounts 158B. With this arrangement, the turbine engine 66 and its engine case 124 may be attached to the first station mount 158A or the second station mounts 158B without changing engine side mounts, using different hardware, etc. The present disclosure, however, is not limited to such an exemplary arrangement. At least one of the first station mounts 158A, for example, may be misaligned from the similarly situated second station mount 158B so as to facilitate mistake proofing. More particularly, by misaligning at least one of the first station mounts 158A from the similarly situated second station mount 158B, the turbine engine 66 and its engine case 124 cannot be attached to the first station mount 158A (or the second station mounts 158B) unless such attachment is intended.

Figure 12B:
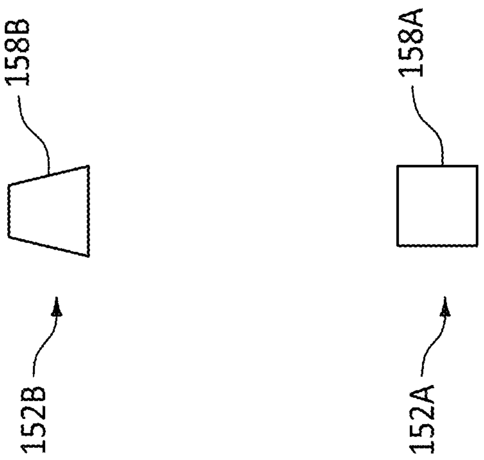
FIGS. 12A and 12B are schematic illustrations of various arrangements of mounts.
Figure 12A:
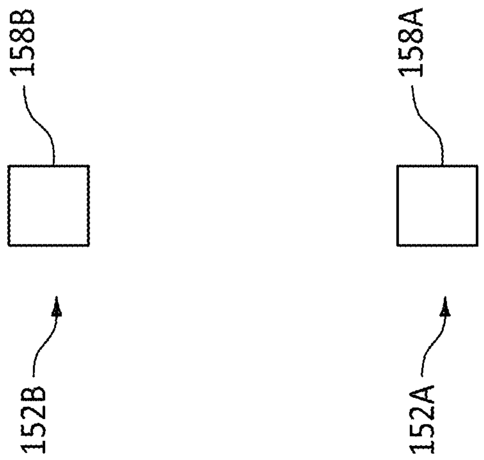

In some embodiments, referring to FIG. 12A, each of the first station mount 158A and a respective similarly situated one of the second station mounts 158B may be configured with a common (the same) configuration, which common configuration includes a common geometry (e.g., shape), common dimension(s), includes common fastener(s) (e.g., bolts, etc.) and the like. With this arrangement, the turbine engine 66 and its engine case 124 of FIGS. 6A-11 may be attached to the first station mount 158A or the second station mounts 158B without changing engine side mounts, using different hardware, etc. The present disclosure, however, is not limited to such an exemplary arrangement. For example, referring to FIG. 12B, at least one (or all) of the first station mounts 158A may be provided with a different configuration than the respective similarly situated one of the second station mounts 158B so as to facilitate mistake proofing. More particularly, by providing different first and second station mount configurations, the turbine engine 66 and its engine case 124 of FIGS. 6A-11 cannot be attached to the first station mount 158A (or the second station mounts 158B) unless such attachment is intended.

The engine flowpath 100 of FIG. 4 extends longitudinally from the flowpath inlet 102, sequentially through the inlet section 92, the LPC section 93A, the HPC section 93B, the combustor section 94, the HPT section 95A, the LPT section 95B and the exhaust section 96, to the flowpath exhaust 104. The engine flowpath 100 of FIG. 4 is configured such that the core air and the combustion products generally flow in the aft, downstream direction towards the propulsion system aft end 60. The core air and the combustion products thereby flow along with the ambient air propelled by the rotating propulsor rotor 68 in a common axial direction—the downstream, aft direction. The turbine engine 66 of the present disclosure, however, is not limited to such an exemplary common flow engine arrangement. For example, the engine flowpath 100 may alternatively be configured such that the core air and the combustion products generally flow in a forward, upstream direction towards the propulsion system forward end 58. The core air and the combustion products may thereby flow in an opposite direction as the ambient air propelled by the rotating propulsor rotor 68. Here, the turbine engine 66 may have a reverse flow engine arrangement.

The aircraft propulsion system 24 of FIG. 4 and its propulsion section 62 are described above with a tractor configuration; e.g., where the propulsor rotor 68 is disposed at or otherwise near the propulsion system forward end 58. It is contemplated, however, the propulsion section 62 may alternatively be disposed at or otherwise near the propulsion system aft end 60 to provide a pusher fan configuration. Moreover, while the turbine engine 66 is described above with a particular two rotating structure arrangement, the present disclosure is not limited thereto. For example, the LPC rotor 106 may be omitted to configure the LPT rotor 109 as a power turbine (PT) rotor for the propulsor rotor 68. In another example, the turbine engine 66 may also include another rotating structure; e.g., an intermediate speed spool for the engine core 98.

The guide vane structure 70 is described above as a fixed (e.g., non-rotatable) guide vane structure. It is contemplated, however, the guide vane structure 70 may alternatively be selectively rotatable about the propulsion system axis 56. With such an arrangement, the aircraft propulsion system 24 may be configured as an open rotor propulsion system with a swirl recovery blade (SRB) open rotor architecture. More particularly, the aircraft propulsion system 24 may operate as: (A) a counter-rotating open rotor (CROR) propulsion system during a dual rotor mode of operation (e.g., when both the propulsor rotor 68 and the structure 70 are counter-rotating about the propulsion system axis 56); and (B) a single open rotor and swirl recovery vane (SRV) propulsion system during a single rotor mode of operation (e.g., when the propulsor rotor 68 is rotating and the structure 70 is rotationally fixed about the propulsion system axis 56). Note, when the guide vane structure 70 is configured to selectively rotate about the propulsion system axis 56, the moving guide vanes 82 operate as propulsor blades.

Figure 13:
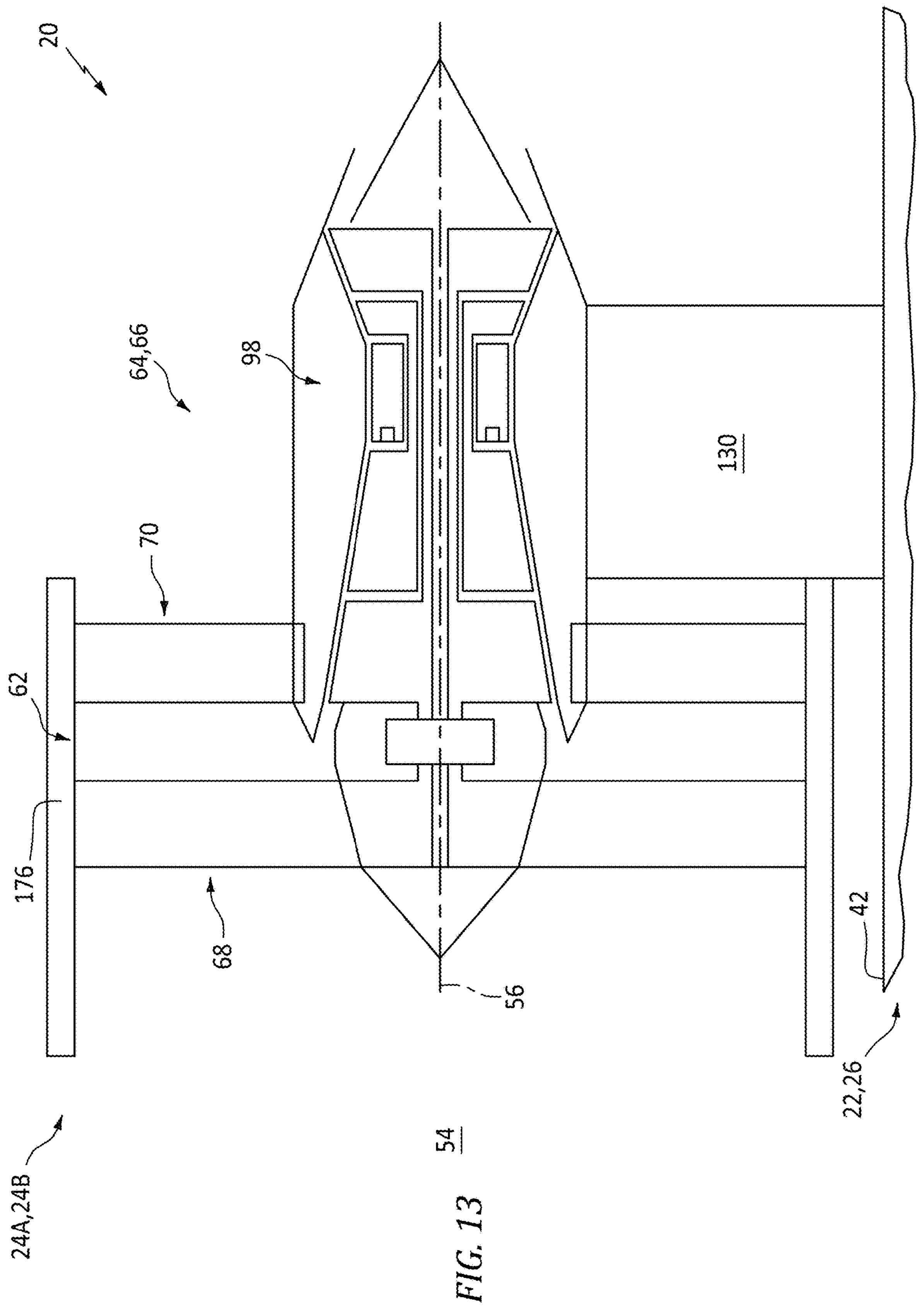
FIG. 13 is a schematic side sectional illustration of the propulsion system mounted to a portion of the aircraft airframe, where the propulsion system includes a ducted propulsor rotor.

The aircraft propulsion system 24 of FIG. 4 and its propulsion section 62 are described as including the guide vane structure 70 with an SRV or SRB configuration. The present disclosure, however, is not limited to such an exemplary propulsion system configuration. For example, the aircraft propulsion system 24 may be configured without an open guide vane structure. The aircraft propulsion system 24 may thereby be configured as a single rotor (SR) open rotor propulsion system. In another example, the aircraft propulsion system 24 may be configured with a set of the open propulsor rotors (e.g., counter-rotating propulsor rotors) operatively coupled to the turbine engine 66 (see FIG. 4) through the geartrain 122. The aircraft propulsion system 24 may thereby be configured as a counter-rotating open rotor (CROR) propulsion system. Moreover, while the aircraft propulsion systems 24 are described above as open rotor propulsion systems, it is contemplated the aircraft propulsion systems 24 may alternatively be configured as ducted propulsion systems. For example, referring to FIG. 13, the propulsor rotor 68 may alternatively be disposed in a duct 176 of the aircraft propulsion system 24 (e.g., a fan duct), where the turbine engine 66 is configured as a turbofan engine for example.

In some embodiments, referring to FIG. 4, the turbine engine 66 and its engine core 98 may be arranged with or otherwise in close proximity to the propulsor rotor 68. With such an arrangement, the propulsion system pylon 130 may support and mount the entire aircraft propulsion system 24 to the aircraft airframe 22. The present disclosure, however, is not limited to such an exemplary arrangement. For example, in other embodiments, it is contemplated one or more or all sections of the turbine engine 66 and its engine core 98 may be arranged remote from the propulsor section 62. In such embodiments, the propulsion system pylon 130 may support and mount the propulsion section 62 and, in some cases, a power turbine driving the propulsor rotor 68.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An apparatus for an aircraft, comprising:

a pylon comprising a leading end, a trailing end, a base end, a first mounting beam, a second mounting beam, a first mounting station and a second mounting station;

the pylon extending longitudinally between the leading end and the trailing end;

the pylon projecting spanwise along a span line out from the base end towards the first mounting station and the second mounting station, the first mounting station disposed a first spanwise distance along the span line from the base end, and the second mounting station disposed a second spanwise distance along the span line from the base end, wherein the second spanwise distance is greater than the first spanwise distance;

the first mounting beam linearly extending from the base end of the pylon to a distal end of the first mounting beam;

the second mounting beam linearly extending from the base end of the pylon to the distal end of the second mounting beam;

the pylon configurable to mount to a portion of a first propulsion system at the first mounting station, wherein the first propulsion system comprises a first propulsor rotor with a first diameter; or a portion of a second propulsion system at the second mounting station, wherein the second propulsion system comprises a second propulsor rotor with a second diameter that is greater than the first diameter;

the first mounting station including a first station first mount configured to attach the portion of the first propulsion system to the first mounting beam and a first station second mount configured to attach the portion of the first propulsion system to the second mounting beam; and the second mounting station including a second station first mount configured to attach the portion of the second propulsion system to the first mounting beam and a second station second mount configured to attach the portion of the second propulsion system to the second mounting beam.

2. The apparatus of claim 1, wherein the pylon further comprises a receptacle laterally between the first mounting beam and the second mounting beam, and the receptacle is configured to receive the portion of the first propulsion system or the portion of the second propulsion system.

3. The apparatus of claim 1, wherein the first station first mount and the second station first mount have different geometries.

4. The apparatus of claim 1, wherein the first station first mount and the second station first mount have a common geometry.

5. The apparatus of claim 1, further comprising
an airframe including a body, a first wing and a second wing;
the pylon mounted to the airframe at the base end.

6. The apparatus of claim 1, wherein at least one of the first propulsor rotor or the second propulsor rotor is configured as an open propulsor rotor.

7. The apparatus of claim 1, wherein at least one of the first propulsor rotor or the second propulsor rotor is configured as a ducted propulsor rotor.

* * * * *